United States Patent [19]
Peterson

[11] 3,983,464
[45] Sept. 28, 1976

[54] DIRECT CURRENT MOTOR SPEED CONTROL APPARATUS

[75] Inventor: Robert S. Peterson, Williamsville, N.Y.

[73] Assignee: Westinghouse Electric Corporation, Pittsburgh, Pa.

[22] Filed: May 13, 1974

[21] Appl. No.: 469,587

[52] U.S. Cl. .............................. 318/327; 318/328
[51] Int. Cl.² .......................................... H02P 5/16
[58] Field of Search ........................... 318/327, 328

[56] References Cited
UNITED STATES PATENTS

| | | | |
|---|---|---|---|
| 3,401,325 | 9/1968 | Stringer | 318/302 |
| 3,508,132 | 4/1970 | Peterson | 318/271 |
| 3,526,819 | 9/1970 | Graf | 318/327 X |
| 3,551,775 | 12/1970 | Safiuddin | 318/434 |
| 3,599,063 | 8/1971 | Nanai | 318/327 |
| 3,668,495 | 6/1972 | Eisele | 318/400 |
| 3,735,225 | 5/1973 | Raatz | 318/327 X |
| 3,809,452 | 5/1974 | Heinz | 318/271 |

*Primary Examiner*—B. Dobeck
*Attorney, Agent, or Firm*—J. J. Wood

[57] ABSTRACT

A direct current motor speed control system is disclosed including a motor armature current controller operative in conjunction with a speed controller and a current reference ramp function generator, such that an effective clamp is provided on the current reference rate of change in the motor speeed control operation in relation to providing less amplification of the noise frequency portion of the motor speed actual feedback signal supplied to the speed controller.

11 Claims, 9 Drawing Figures

DIRECT CURRENT MOTOR SPEED CONTROL APPARATUS

BACKGROUND OF THE INVENTION

It is known in the prior art to provide linear speed control systems for rolling mill drive motors, such as described in an article published in the 1966 Iron and Steel Engineer Year Book at pages 659 to 667.

A speed control apparatus for controlling the DC drive motors of a tandem cold strip rolling mill should be very fast in operation. The application of such a speed control apparatus to a reversing slab mill does not require such a high speed of response, since there is less interaction with other control loops such as a tension regulator. It is desired that the speed controller portion of this apparatus be made very fast in operation, but this is limited by signal noise problems with regard to the input signal providing process condition sensor, such as the actual motor speed feedback signal providing tachometer operated with the mill stand drive motor. The noise in the speed feedback signal varies with the speed of operation of the tachometer.

One prior art speed regulator apparatus that has been applied to the control of such a DC drive motor, included a speed controller as shown by U.S. Pat. No. 3,668,495 of H. Eisele, assigned to the same assignee, including a ramp function generator operative with the output voltage limit of a speed controller. In order for the associated current rate limit circuit to function as intended, a signal deadband is provided in which the current rate limit is not effective. During the time when the speed controller output signal is within this deadband, there is no limit provided on the motor armature current rate. This permits a higher noise level to pass to the armature current controller.

A tandem cold mill drive motor speed controller operation is generally adjusted such that the response to tachometer signal noise is the limiting parameter determining the operation of the speed controller.

It has been known in prior art such as shown in U.S. Pat. No. 3,401,325 of L. F. Stringer, U.S. Pat. No. 3,508,132 of R. S. Peterson and U.S. Pat. No. 3,552,775 of M. Safiuddin, assigned to the same assignee, to provide direct current motor speed control apparatus, including a thyristor power supply operative with such a motor and a speed controller operative with a current controller for determining the operation of sais thyristor power supply. A motor armature current sensor is provided to feedback to said current controller a signal in accordance with the motor armature current, and a motor speed sensor is provided to feedback to said speed controller a signal in accordance with the operating speed of the motor.

SUMMARY OF THE INVENTION

A direct current motor speed control apparatus is provided, including a faster operating speed controller operative with a current reference ramp function generator such that a limited rate of build up of the armature current is provided, with motor commutation problems being reduced.

DESCRIPTION OF THE PREFERRED EMBODIMENT

Figure 1:
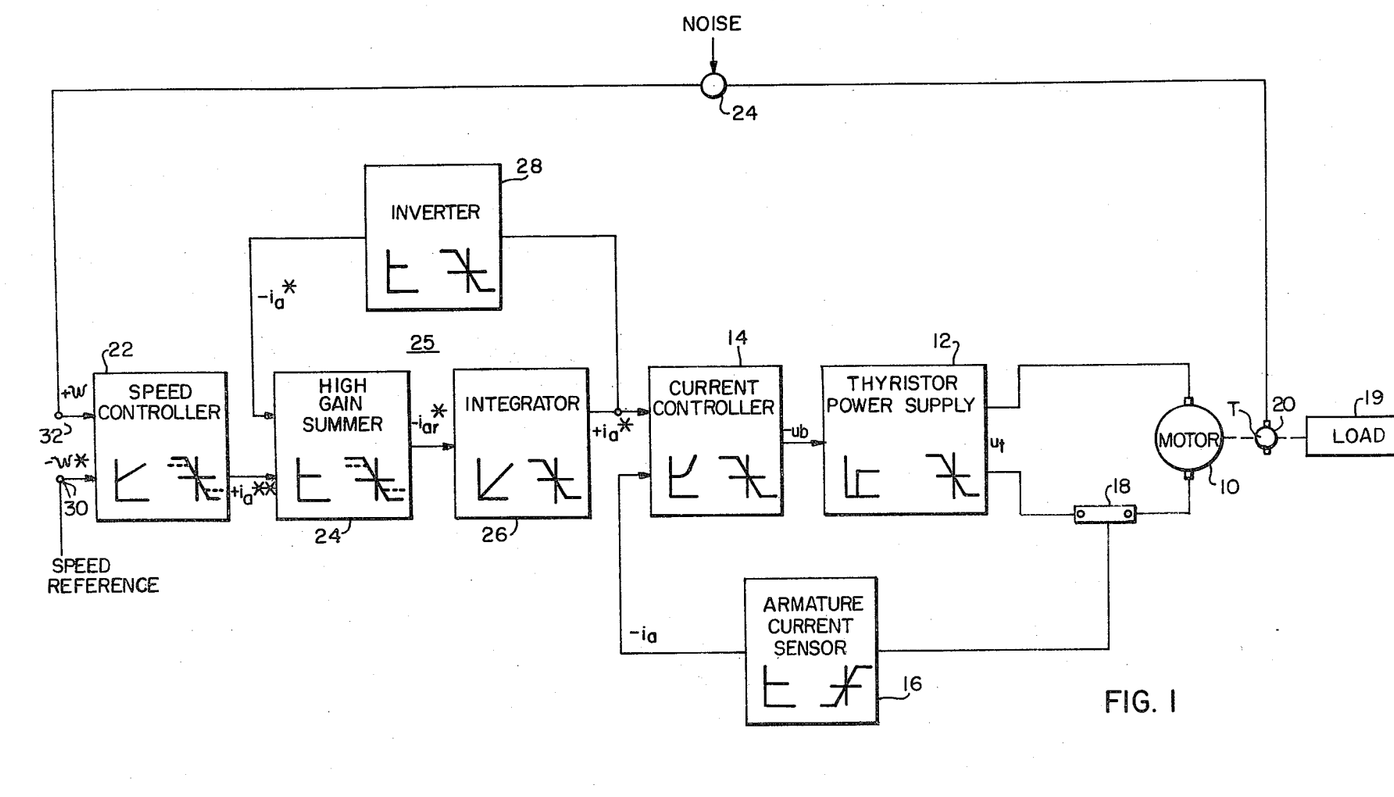
FIG. 1 shows a system diagram of the speed control apparatus for a direct current motor in accordance with the present invention.

In FIG. 1 there is shown a speed control apparatus for a direct current drive motor 10 connected to be energized by a thyristor power supply 12 in response to an armature voltage reference signal $-v_b$ from a current controller 14 and including an armature current sensor 16 operative with a shunt 18 for providing an actual current negative feedback signal $-i_a$ to the current controller 14. The direct current motor 10 is operative with a load 19 and includes a speed responsive tachometer 20 for providing an actual speed signal $+\omega$ to one input of a speed controller 22 including a signal noise component symbolically introduced at 24. The speed controller also receives a desired motor speed reference signal $-\omega^*$ and provides an output current reference signal $i_a^{**}$ to one input of a high gain summer circuit 24 operative with an integrator apparatus 26 and including an inverter 28, for inverting the output current reference signal $+i_a^*$ from the integrator 26 as applied to the current controller 14 and as desired for application to a second input of the high gain summer apparatus 24.

In the blocks shown in FIG. 1 the curve illustrated on the input side of each block represents the time response of the circuit apparatus to a step input signal while the curve on the output side of each block represents the operations linearity of the circuit apparatus. The desired motor speed reference signal $-\omega^*$ is applied to input terminal 30 of speed controller 22. The motor actual speed signal $-\omega$ from the tachometer 20 is applied to terminal 32 of the speed controller 22. The time response of a step input signal to the speed controller 22 is preferably the well known PI characteristic including integrating properties to assure that there is no permanent speed droop caused by driven loads provided that the noise component of the actual speed feedback signal $-\omega$ from the tachometer 20 does not cause the output of the speed controller to saturate. Saturation of the speed controller 22 caused by tachometer noise is called demodulation of the speed controller output signal and results in permanent load droop built into the speed controller. Low frequency tachometer noise can pass through the speed control apparatus shown in FIG. 1 to result in the speed of the motor 10 following the low frequency tach noise. For tachometer noise signal frequency higher than about 7 hertz, the higher frequency noise signal is greatly reduced by the operation of the current reference ramp including the high gain summer 24 and the integrator 26, before the high frequency noise reaches the armature current control loop including current controller 14. Thusly, high frequency tachometer signal noise greater than about 7 hertz is reduced while low frequency tachometer noise below about 7 hertz tends to pass through the speed control apparatus shown in FIG. 1. The lower frequency tachometer noise is the result of tachometer misalignment, gear or belt noise. The effective gain of the speed controller 22 gradually increases in the positive or negative direction depending upon the polarity of the applied input signal until it reaches a point of saturation. Furthermore, the point of saturation can vary downwardly or upwardly as shown for example by the dotted lines on the gain curve for speed controller 22. When the signal voltages applied to the respective terminals 30 and 32 do not cancel, the speed controller 22 integrates the difference and the output increases unitl the saturation limits are reached. The output signal from the speed controller 22 is applied as one input to the high gain summer 24, with the other input to the high gain summer 24 being a feedback current reference signal applied through inverter 28 from the output of the integrator 26. When the two inputs to the high gain summer do not cancel each other, a proportional characteristic response to the difference is applied as an output signal to the integrator 26 which integrates this difference and applies the integral of the signal difference as an output current reference signal $+i_a*$ to the current controller 14 until the output signal from the high gain summer 24 goes to zero. Note that the output gain curve of the high gain summer 24 will saturate at a positive or a negative level, if the current reference signal $i_a*$ does not match the signal $i_a**$. The current controller 14 responds to the armature current reference signal $+i_a*$ from the integrator 26 and the actual armature current negative feedback signal $-i_a$ from the armature sensor 16 in accordance with the $(PI)^2$ characteristic of the current controller 14 as shown by the time response curve of the current controller 14 in response to any difference between the reference signal $+i_a*$ from the integrator 26 and the actual armature current feedback signal $-i_a$ from the armature current sensor 16. The output signal $-v_b$ of the current controller 14 is applied to a thyristor power supply 12 to determine the voltage supplied to the armature of the drive motor 10, for controlling the operation of the drive motor 10 in accordance with the speed reference signal applied to terminal 30 of the speed controller 22. The symbols for the respective output signals provided by the speed controller 22, the high gain summer 24, the integrator 26 and so forth are output voltage symbols and their indicated polarity is in accordance with the drive motor 10 running in a forward direction, with forward armature current and forward thyristor output voltage being indicated by a positive polarity.

Figure 2:
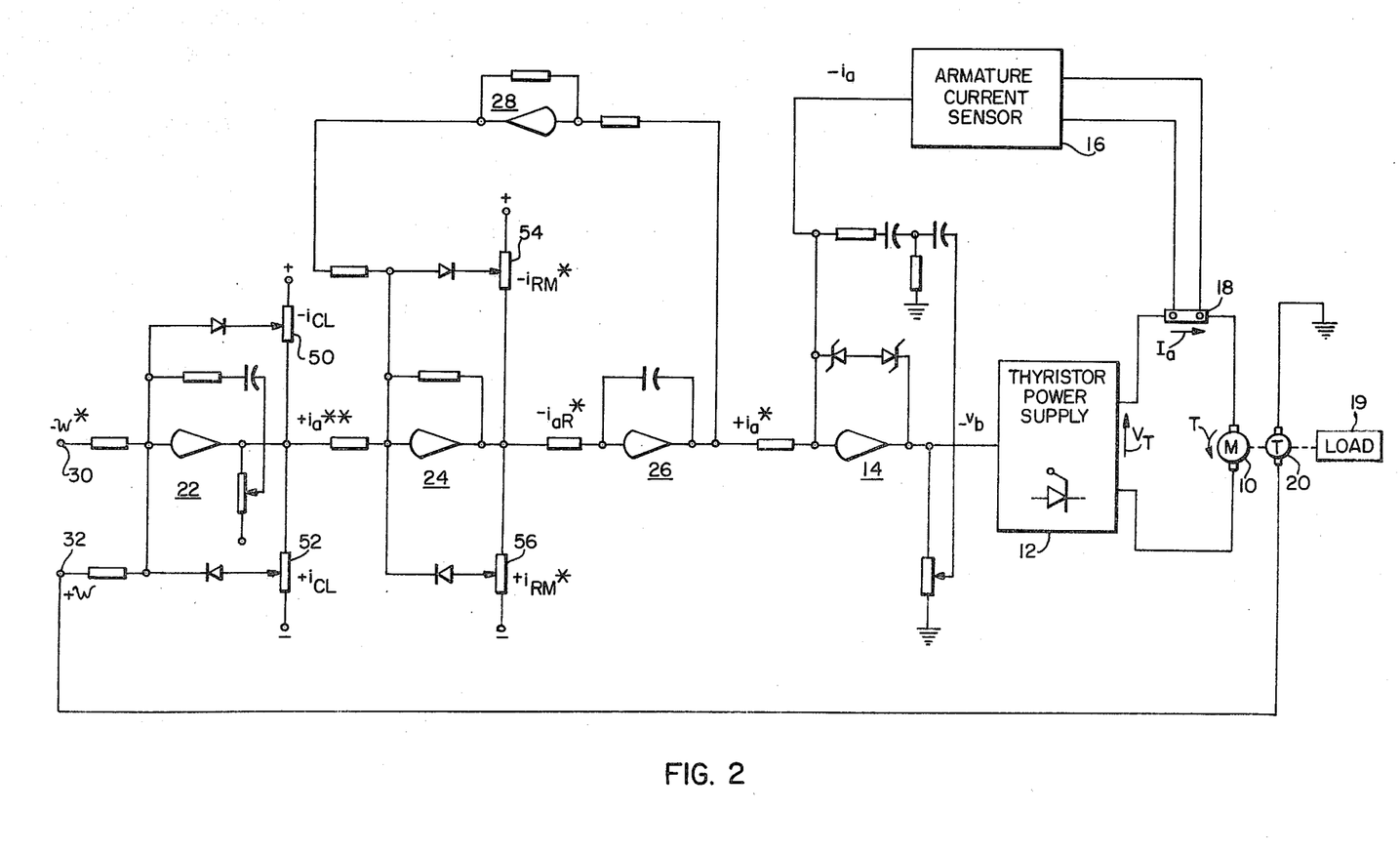
FIG. 2 shows a schematic diagram of the speed control apparatus shown in FIG. 1.

In FIG. 2 there is shown a schematic diagram of the speed control apparatus shown in FIG. 1 with the speed controller 22 including a potentiometer 50 for setting the negative current limit and a potentiometer 52 for setting the positive current limit operation of the speed controller 22. The current reference ramp includes the high gain summer 24 having a potentiometer 54 for setting the positive current rate limit and a potentiometer 56 for setting the negative current rate limit. The armature current sensor 16 can be magnetic isolation amplifier. The current reference ramp controls the maximum amplitude as a predetermined function of time of the output signal applied to the current controller 14, and thereby determines the armature current of the drive motor 10 and controls the rate of the change in the armature current of the drive motor 10.

Figure 3:
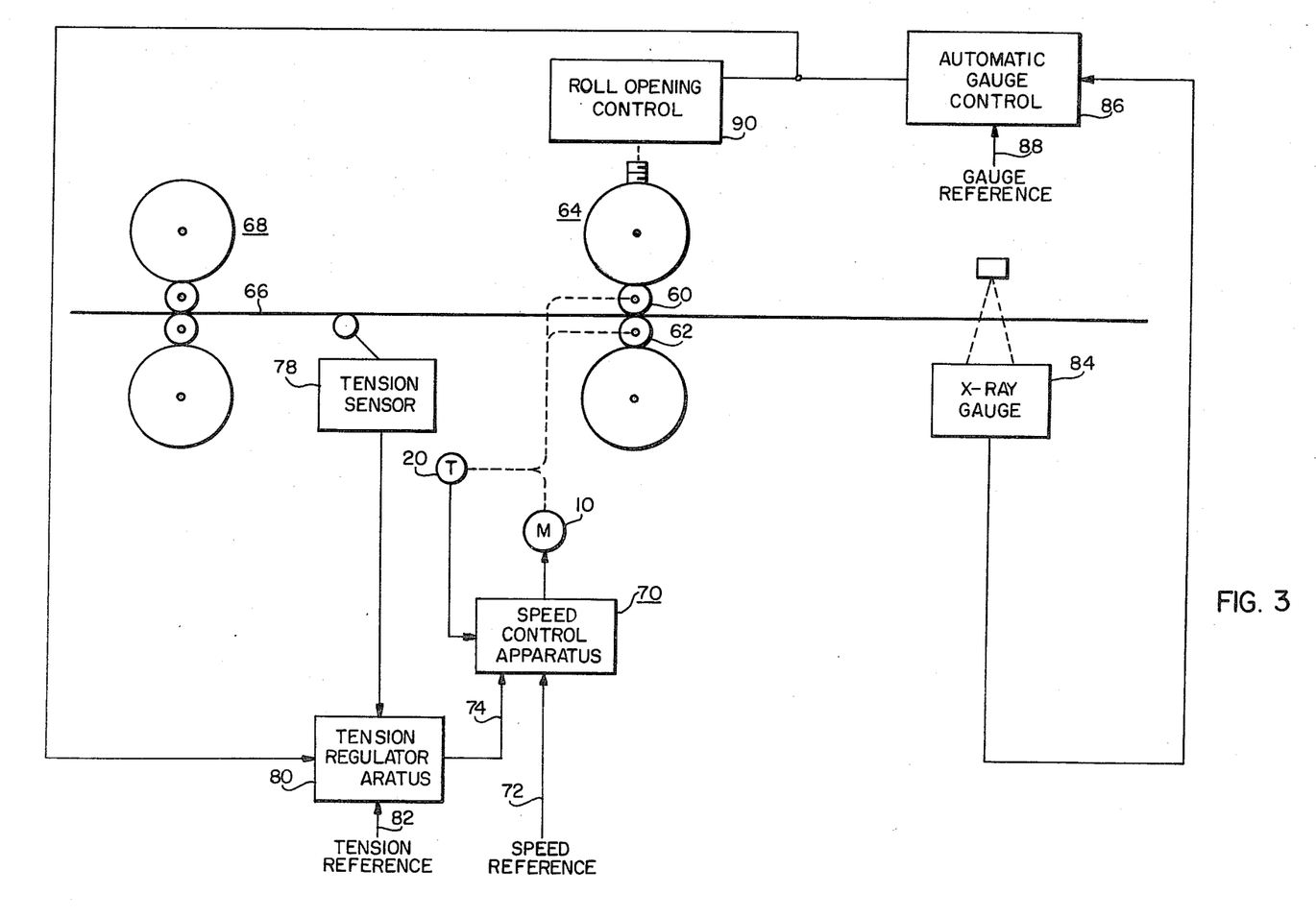
FIG. 3 illustrates a rolling mill industrial process application of the speed control apparatus of the present invention.

FIG. 3 illustrates an industrial process application of the speed control apparatus, such as shown in FIG. 1, for controlling the operational speed of drive motor 10 connected to drive the work rolls 60 and 62 of a rolling mill stand 64. A workpiece strip 66 is shown passing through the controlled roll stand 64 in relation to a previous roll stand 68 such that a control tension is provided for the workpiece strip 66 therebetween. The speed control apparatus 70 is operative with the drive motor 10 and receives an actual speed feedback signal from tachometer 20 and an operator supplied speed reference input signal 72. If desired, an additional workpiece strip tension error related input signal 74 can also be provided as well known in this art. A strip tension sensor 78 is operative with a tension regulator apparatus 80 in relation with an operator provided desired tension reference input signal 82, with the strip tension correcting error signal 74 being applied to the speed control apparatus 70 for adjusting the workpiece strip tension between the roll stands 64 and 68 in a direction to correct any determined tension error condition. An X-ray gauge 84 is positioned to sense the delivery gauge or thickness of the workpiece strip 66 leaving the roll stand 64. The gauge signal from the X-ray gauge 84 can be operative with an automatic gauge control 86 in relation to an operator provided gauge reference signal 88 for controlling the roll opening setting between the work rolls 60 and 62 through operation of a roll opening control 90, and the gauge error signal can additionally be applied to the tension regulator apparatus 80 as well known to persons skilled in the art.

The rolling mill drive motor control apparatus shown in FIG. 3 is a multi-loop control system, and it is important for stability of operation reasons that the inner loops be made as fast as feasible with the outer loops being of necessity slower in operation. For example, in theory the speed control loop will be made very fast in operation, the tension control loop will be made about one-half the speed of the response of the speed control loop and the AGC control loop will be made about one-half as fast in operation as the speed of the tension control loop in respect to the relative response speeds of operation, for stability.

Figure 4:
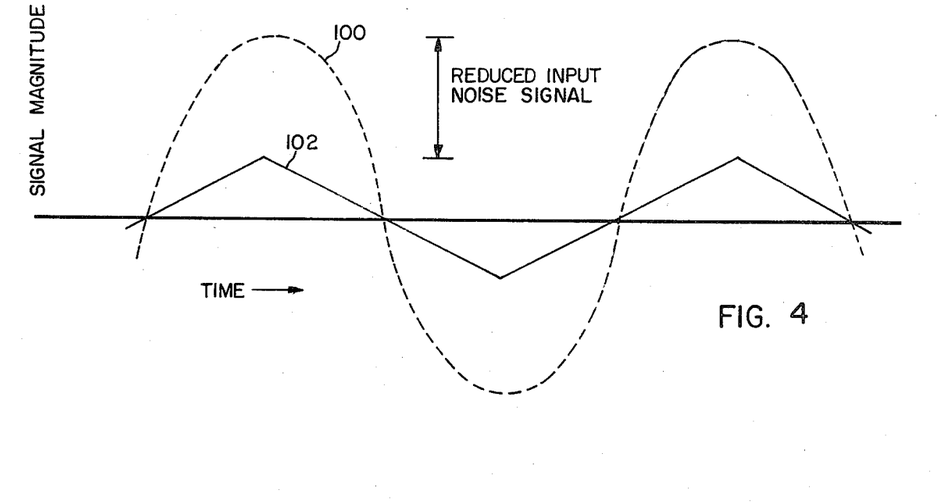
FIG. 4 is a curve plot illustrating the reduction in rate of change in armature current controlling reference signal in relation to amplitude changes of the noise component of the feedback actual speed signal of the controlled motor.

The curve shown in FIG. 4 illustrates the reduction in rate of change of armature current controlling reference signal in relation to the amplitude changes of the high frequency noise component of the feedback actual speed signal of the controlled motor. The reduced noise signal is indicated in FIG. 4 in that the curve 100 shows the input speed noise signal magnitude from the speed sensor 20 whereas the curve 102 indicates the maximum speed noise signal that can pass through the current reference ramp, including the high gain summer 24 and integrator 26, as a function of time.

Figure 5:
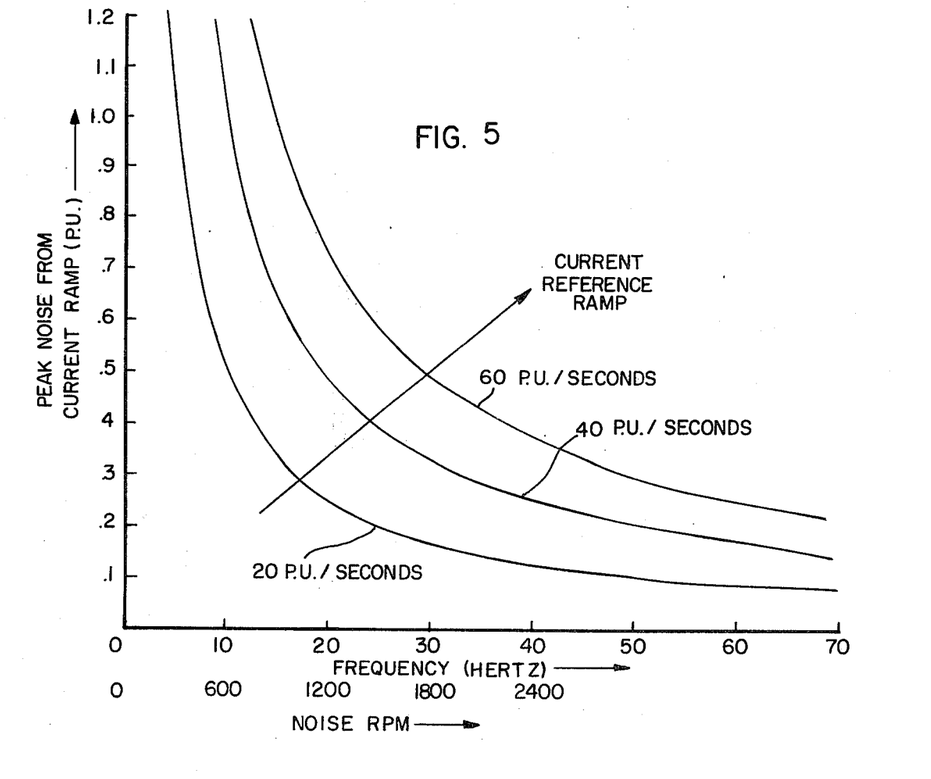
FIG. 5 shows a curve plot illustrating the maximum noise peak that the current reference ramp will pass as a function of tachometer feedback speed signal frequency and the provided ramp rate.

The curves of FIG. 5 illustrates the maximum noise peak that the current reference ramp will pass as a function of tachometer frequency and ramp rate. A sinusoidal tachometer noise will give a sawtooth output signal from the ramp with a maximum peak value as given in FIG. 5 and regardless of the magnitude of tachometer noise the ramp output noise cannot exceed this value. If the tachometer noise is below this peak, the noise out of the ramp becomes more sinusoidal, and for very low magnitude tachometer noise the ramp reproduces the noise from the speed controller. The tachometer noise passed by the current reference ramp including the associated filter for higher noise frequencies of 20 hertz and above is so small that it does not substantially affect the drive performance. Low frequency noise in the order of 5 hertz and below will pass through the current reference ramp. As the tachometer noise frequency increases above 15 hertz, the current reference ramp will pass less noise and at 20 hertz the tachometer noise passed becomes negligible. Tachometer frequencies of 20 hertz and above have a maximum peak of 0.1 per unit current reference, which will not influence the drive system performance with the ramp rate set at 20 per unit per second. If the current reference ramp is increased above 20 per units per second, it will be capable of passing proportionally more noise.

In relation to the system diagram shown in FIG. 1, it should be understood that the current controller 14 comprises a $(PI)^2$ characteristic controller, such as disclosed in my copending patent application Ser. No. 324,054 and filed Jan. 16, 1973. The current reference ramp including the high gain summer 24, the integrator 26 and the inverter 28, and the current controller 14 having $(PI)^2$ characteristic in effect includes two integrator circuits in the armature current loop and reduces current limit overshoot and the rate of change of the armature current during an impact stall load condition. While the drive motor and load are coming to rest the steady-state stall current matches the current limit setting. The current limit setting is adjusted by adjusting the output saturation limits of the speed controller 22. The PI speed controller 22 integrating properties assures that there is no permanent speed droop caused by driven loads, providing the noise from the tachometer sensor does not cause the output of the speed controller 22 to saturate.

Figure 6:
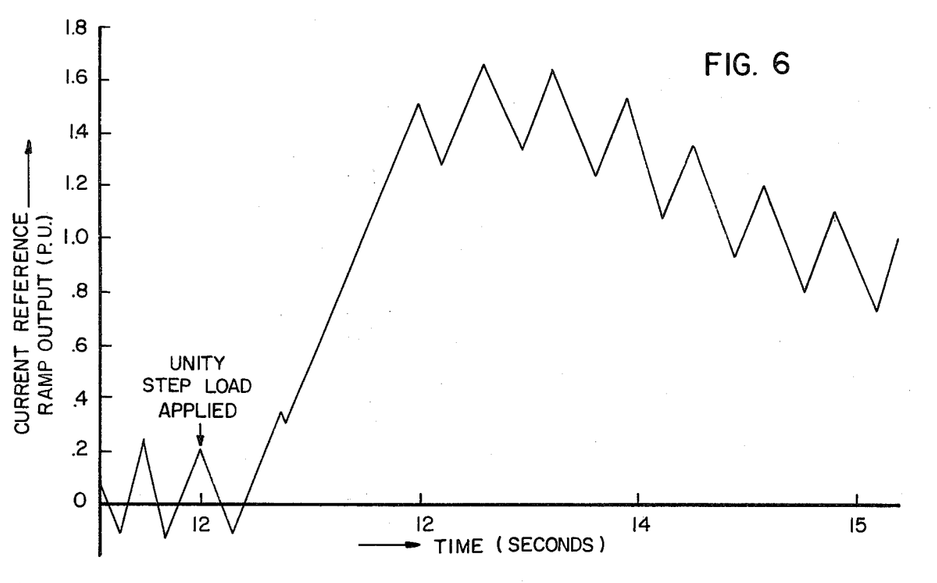
FIG. 6 shows a curve illustrating the per unit response of the present speed controller as a function of time in relation to a unity step load applied to the controlled motor.

The curve shown in FIG. 6 illustrates the current reference signal $i_a^*$ supplied to the current controller 14 shown in FIG. 1.

Figure 7:
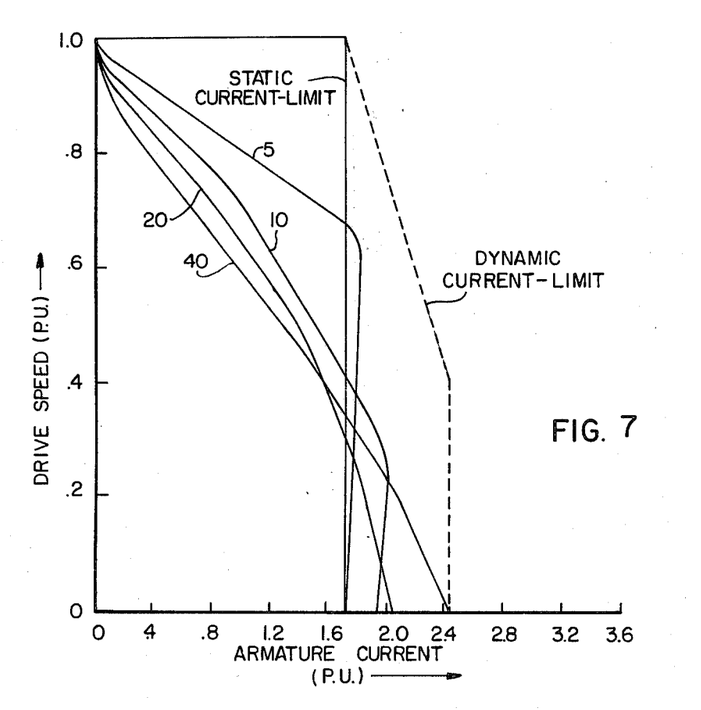
FIG. 7 shows a curve plot illustrating the controlled motor speed response characteristic of the present controller for various per unit stall load conditions.

The curves shown in FIG. 7 illustrate the controlled speed of drive motor 10 operative with the combination of the current reference ramp 25 and the current controller 14 having $(PI)^2$ characteristics as shown in FIG. 1, for respective step stall loads of 5, 10, 20 and 40 per unit.

Figure 8:
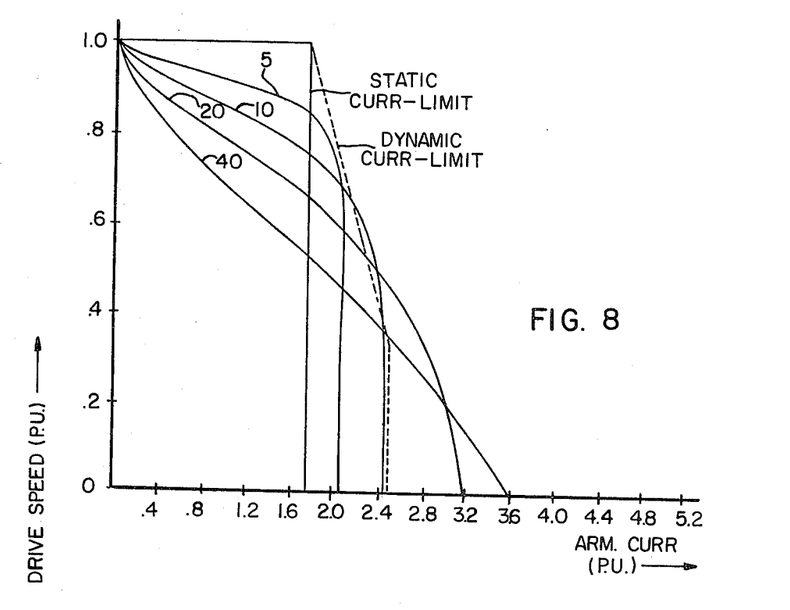
FIG. 8 shows a curve plot illustrating the controlled motor speed response characteristic of a typical prior art controller for various per unit step stall load conditions.

The curves shown in FIG. 8 illustrate the controlled speed of drive motor 10 for a typical prior art speed control apparatus, under similar step stall load conditions in accordance with the showing of FIG. 7.

Figure 9:
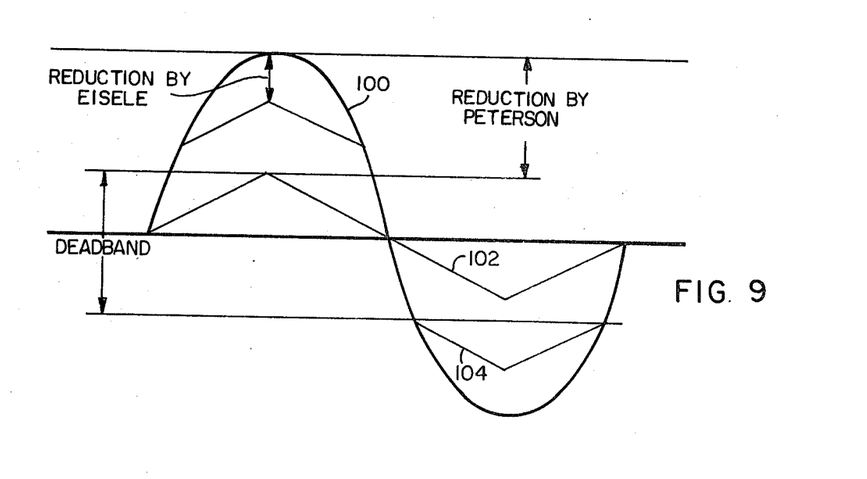
FIG. 9 shows a curve plot illustrating the comparative operation of the prior art motor speed control system of the cited U.S. Patent 3,668,495 in relation to the present motor speed control system to show the improved reduction in the input noise signal provided by the present motor speed control system.

The curves shown in FIG. 9 are provided to illustrate the improved reduction in the effect of the input noise signal by the present speed control apparatus shown in FIG. 1 as compared with the prior art speed control apparatus shown in above cited Eisele reference. The curve 100 shows the illustrative input speed noise signal from the speed sensor and the curve 102 shows the maximum speed noise signal that can pass through the current referecne ramp shown in FIG. 1 to control the armature current of motor 10. The curve 104 shows the maximum speed noise signal that can be provided by the speed controller of the above cited Eisele reference to control the motor armature current. Thusly, the curve 102 illustrates the effective clamp put on the maximum armature current rate at all time by the present invention. The current reference ramp 25 limits the noise signal passing through the speed controller 22 and applied to the armature current controller 14.

What we claim is:

1. In speed control apparatus for a direct current motor, the combination of
    means operative with said motor for supplying the armature current of said motor,
    speed control means responsive to the difference between a desired speed and the actual speed of said motor for providing a motor speed determining armature current control signal,
    means operative with said armature current control signal, for providing a predetermined limit on the controlled rate of change for all values of said armature current control signal; and
    means operative with said armature current supply means for controlling the armature current of said motor in response to said current control signal.

2. The speed control apparatus of claim 1, wherein said means for providing a controlled rate of change determines a predetermined ramp limit on the armature current rate of change of said motor.

3. The speed control apparatus of claim 1,
    with said means for providing a controlled rate of change for all values of said armature current control signal being operative to limit the maximum rate of change of the motor armature current.

4. The speed control apparatus of claim 1, wherein said rate of change providing means includes a ramp function circuit operative to limit the rate of change in the armature current.

5. In apparatus for controlling a direct current motor in response to a desired speed signal, the combination of
    means operative with said motor for providing an actual speed signal,
    means responsive to the difference between said desired speed signal and said actual speed signal for providing a motor speed control signal,
    means for providing a predetermined limit on the armature current rate control signal for all values of said desired speed signal, and
    means operative with said motor for controlling the actual speed of said motor in response to said speed control signal, 6. The apparatus of claim 5, wherein said means responsive to the difference between said desired speed signal and said actual speed signal is a speed controller having a proportional plus integral operational characteristic.

7. The apparatus of claim 5, wherein said rate of change providing means establishes a predetermined ramp limit on said armature current control signal.

8. The apparatus of claim 5, with said actual speed controlling means being operative to establish the armature current of said direct current motor.

9. The apparatus of claim 5, with said rate of change providing means being operative to limit the maximum rate of change of the motor armature current.

10. The apparatus of claim 5, wherein said actual speed signal includes a noise component, and
   with said rate of change providing means being operative to limit the maximum rate of change of said armature current control signal in relation to said noise component.

11. The apparatus of claim 5, with said actual speed controlling means being operative to establish the armature current of said motor, and
   with said rate of change providing means being operative to limit the armature current overshoot in relation to a stall load condition.

* * * * *